United States Patent
Jokinen et al.

(10) Patent No.: US 8,107,937 B2
(45) Date of Patent: Jan. 31, 2012

(54) SYSTEM AND METHOD FOR AUTOMATIC PROVISIONING DETECTION AND NOTIFICATION

(75) Inventors: Hannu J. Jokinen, Kauniainen (FI); Esa Ihamäki, Nokia (FI)

(73) Assignee: Nokia Corporation, Espoo (FI)

(*) Notice: Subject to any disclaimer, the term of this patent is extended or adjusted under 35 U.S.C. 154(b) by 2288 days.

(21) Appl. No.: 09/919,317

(22) Filed: Jul. 31, 2001

(65) Prior Publication Data

US 2003/0027581 A1   Feb. 6, 2003

(51) Int. Cl.
    H04M 3/00   (2006.01)
(52) U.S. Cl. ......................... 455/418; 455/410
(58) Field of Classification Search ............... 455/419, 455/456, 418, 423, 425
    See application file for complete search history.

(56) References Cited

U.S. PATENT DOCUMENTS

| | | | |
|---|---|---|---|
| 5,152,011 A * | 9/1992 | Schwob ................ | 455/158.5 |
| 5,365,572 A * | 11/1994 | Saegusa et al. ......... | 455/463 |
| 5,386,455 A | 1/1995 | Cooper | |
| 5,404,355 A * | 4/1995 | Raith ..................... | 370/311 |
| 5,809,413 A * | 9/1998 | Meche et al. ........... | 455/411 |
| 5,819,177 A * | 10/1998 | Vucetic et al. ......... | 455/425 |
| 5,956,636 A | 9/1999 | Lipsit | |
| 6,134,435 A | 10/2000 | Zicker et al. | |
| 6,188,899 B1 | 2/2001 | Chatterjee et al. | |
| 6,282,421 B1 * | 8/2001 | Chatterjee et al. ..... | 455/435.1 |
| 6,377,791 B1 | 4/2002 | Pirila | |
| 6,519,468 B1 * | 2/2003 | Donovan et al. ........ | 455/466 |
| 6,587,684 B1 * | 7/2003 | Hsu et al. ............... | 455/419 |
| 6,600,930 B1 * | 7/2003 | Sakurai et al. .......... | 455/414.3 |
| 6,615,038 B1 * | 9/2003 | Moles et al. ............. | 455/418 |
| 6,636,502 B1 * | 10/2003 | Lager et al. .............. | 370/352 |
| 6,658,231 B2 * | 12/2003 | Nakatsuyama ......... | 455/3.06 |
| 6,757,544 B2 * | 6/2004 | Rangarajan et al. .... | 455/456.1 |
| 6,839,564 B2 * | 1/2005 | Sutinen et al. ........... | 455/502 |
| 2001/0034204 A1 | 10/2001 | Pentikainen | |

FOREIGN PATENT DOCUMENTS

| | | |
|---|---|---|
| EP | 1 043 906 | 10/2000 |
| WO | WO 00/22794 | 4/2000 |
| WO | WO 00/78076 | 12/2000 |

* cited by examiner

*Primary Examiner* — George Eng
*Assistant Examiner* — Marcos Torres
(74) *Attorney, Agent, or Firm* — Hollingsworth & Funk, LLC

(57) ABSTRACT

A system and method for automatically initiating provisioning procedures is provided. Terminals that have not been provisioned for connection to a network or service are automatically recognized at the network. When such an unprovisioned terminal has been detected, a notification is dispatched to an appropriate provisioning network entity to initiate the provisioning procedures for the unprovisioned terminal.

45 Claims, 10 Drawing Sheets

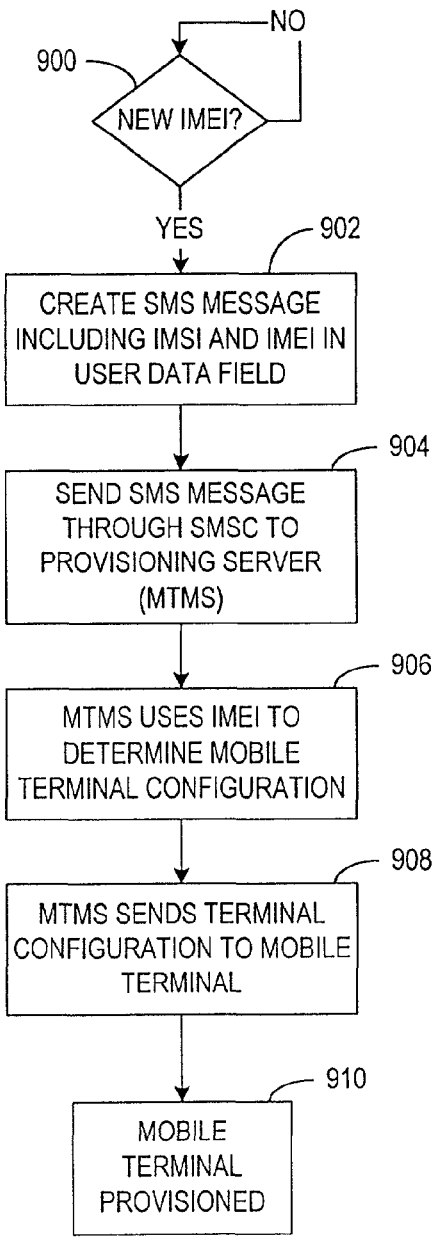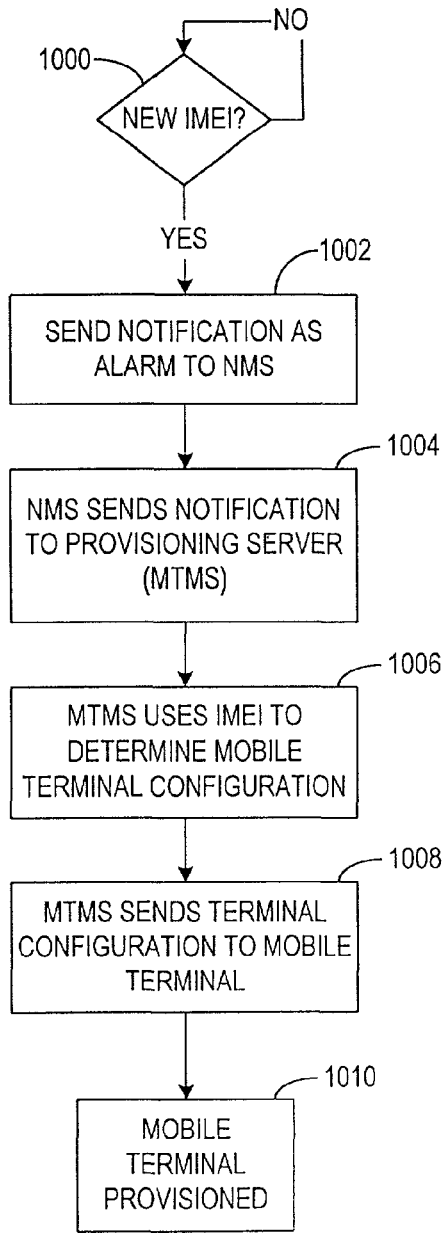
*FIG. 9*            *FIG. 10*

SYSTEM AND METHOD FOR AUTOMATIC PROVISIONING DETECTION AND NOTIFICATION

FIELD OF THE INVENTION

The present invention relates generally to network communications systems, and more particularly, to a system and method for automatically detecting mobile terminals in the network in need of provisioning, and directing the provisioning entity to effect such provisioning.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks such as the Internet has availed a sea of information to an information hungry society. These networking technologies have expanded to increasingly include wireless and mobile technologies. Through these networks, information can be downloaded to desktop systems, wireless systems, mobile systems, etc. For example, information available via the Internet can now be downloaded onto mobile wireless units, such as cellular telephones, personal digital assistants (PDAs), laptop computers, etc. One such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms.

Second generation wireless service, often referred to as 2G wireless service, is a current wireless service based on circuit-switched technology. 2G systems, such as Global System for Mobile communications (GSM) and Personal Communications Services (PCS), use digital radio technology for improved quality and a broader range of services over first generation mobile technologies. 3G, or third generation, refers to a set of digital technologies that promises improvements in capacity, speed and efficiency by deploying new packet-based transmission methodologies between terminals and the network. Users of 3G devices and networks will have access to multimedia services such as video-on-demand, video conferencing, fast web access and file transfer.

With the introduction of new mobile services such as WAP, Multimedia Messaging Service (MMS), calendar and contact synchronization, as well as a multitude of other possibilities, the number of servers and portals providing services for mobile Internet terminals continues to expand. Further, there is an increasing number of features associated with these services, such as support for multimedia, location-based services, electronic payments, etc. Thus, new terminals supporting new network technologies and mobile Internet services will continuously be taken into use, often as replacement devices for existing subscribers. The new terminals will increasingly require additional initial configuration settings before they can successfully connect to the servers.

The continual addition of new technologies and services availed to mobile users may, however, create additional burdens on users. For example, setting the initial configuration parameters, generally referred to as "provisioning," may become increasingly complex and demanding. Further, as these new services and applications continue to roll out, or existing services provide upgrades, configuring or reconfiguring mobile devices becomes a more frequent requirement for end users.

Conventional provisioning systems required that a retail establishment provision the terminal for the user. This, however, is inconvenient for the user. Further, if the user decided to purchase a different terminal or upgrade services, the user was forced to return to the dealer to provision, or re-provision the terminal.

More recent provisioning systems have made it possible to allow the user to initiate provisioning from the device. For example, a user may manually initiate provisioning from the device to be provisioned. This, however, necessitates that the user understand that provisioning is required, and also requires that the user know how to initiate the provisioning, or at the very minimum requires the user to follow a set of instructions to initiate the provisioning. Not only does this inconvenience mobile terminal users, it threatens to frustrate those users who are otherwise unfamiliar with, or otherwise resistant to utilize, high-technology devices.

In other provisioning systems, a remote server device may instigate a communications session with a provisioning server device, and provide the provisioning server with provisioning information. Again, such a system requires an explicit action in order to initiate provisioning of the mobile terminal.

Therefore, the challenge still remains to automate provisioning procedures used to provision terminals. There is a need in the communications industry for a system and method for automating initiation of provisioning procedures for mobile terminals. The present invention provides a solution to these and other shortcomings of the prior art, and offers additional advantages over the prior art.

SUMMARY OF THE INVENTION

The present invention is directed to a system and method for automatically detecting unprovisioned terminals in a mobile communications network, and dispatching notifications of such unprovisioned terminals to an appropriate provisioning network entity to initiate provisioning procedures.

In accordance with one embodiment of the invention, a method is provided for initiating provisioning procedures for terminals operable in a mobile communications network. The method includes automatically detecting an unprovisioned terminal in the mobile communications network. When such an unprovisioned terminal has been detected, a notification is provided to a provisioning server to initiate the provisioning procedures for the unprovisioned terminal.

In accordance with other more particular aspects of the invention, a variety of features may be provided in connection with such a methodology for initiating provisioning procedures for unprovisioned terminals. For example, in particular embodiments, the method includes monitoring for a subscriber identifier identifying a particular subscriber, and for an equipment identifier identifying the unprovisioned terminal. The automatic detection may include determining that the subscriber and equipment identifiers do not, as a pair, correspond to known subscriber and equipment pairs. In one exemplary embodiment, the subscriber identifier includes an International Mobile Subscriber Identity (IMSI), and the equipment identifier includes an International Mobile Equipment Identity (IMEI). According to certain embodiments of the invention, the subscriber and equipment identifiers are provided by the unprovisioned terminal in connection with an attach or location update procedure. The automatic detection can occur at a predefined network entity, such as at the Mobile Switching Center (MSC) or the Serving GPRS Support Node (SGSN).

In accordance with another embodiment of the invention, a provisioning system for automatically provisioning terminals in a mobile communications network is provided. The system includes a detection module coupled to the mobile communications network to monitor for at least a subscriber identifier and an equipment identifier transmitted from an unprovisioned terminal. A provisioning trigger module, coupled to the detection module, generates a provisioning notification based on the subscriber and equipment identifiers, where the provisioning notification indicates that the unprovisioned terminal has been introduced on the mobile communications network. A provisioning server is coupled to receive the provisioning notification from the provisioning trigger module, and in response, instigates provisioning procedures with the unprovisioned terminal.

The above summary of the present invention is not intended to describe each illustrated embodiment or implementation of the present invention. This is the purpose of the figures and the associated discussion which follows.

BRIEF DESCRIPTION OF THE DRAWINGS

FIGS. 9 and 10 are flow diagrams illustrating exemplary embodiments of a network element providing a notification to a provisioning server that a terminal requires provisioning.

DETAILED DESCRIPTION OF THE ILLUSTRATED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is directed to a system and method for initiating provisioning for mobile devices from a network. Terminals that need provisioning and configuration data for connecting to the network services are automatically detected by the communications network. Upon detecting such an unprovisioned terminal, the network instigates issuance of a notification of such an unprovisioned terminal to a provisioning server, which in turn provides the provisioning and configuration data to the terminal. This automatic detection and notification automatically initiates supplying these unconfigured terminals with their initial connection settings, i.e., the bootstrap configuration information. This allows a variety of advantages, including allowing mobile terminals to be purchased from any terminal dealer, as the dealer does not have to provision the terminal. There is further no need for users to initiate a provisioning procedure, as it is automatically detected and initiated by the network. Further, even where a terminal already includes some configuration data on the device itself, on an associated Subscriber Identity Module (SIM), etc., the correct and most up-to-date configuration can be provided to the terminal in real time. The automatic detection and notification in accordance with the present invention also dispels the need to access some other device, such as a dedicated Internet web site, during provisioning procedures. The automated nature of the provisioning procedure of the invention can also significantly reduce the need for users to contact customer service organizations for provisioning assistance.

Figure 1:
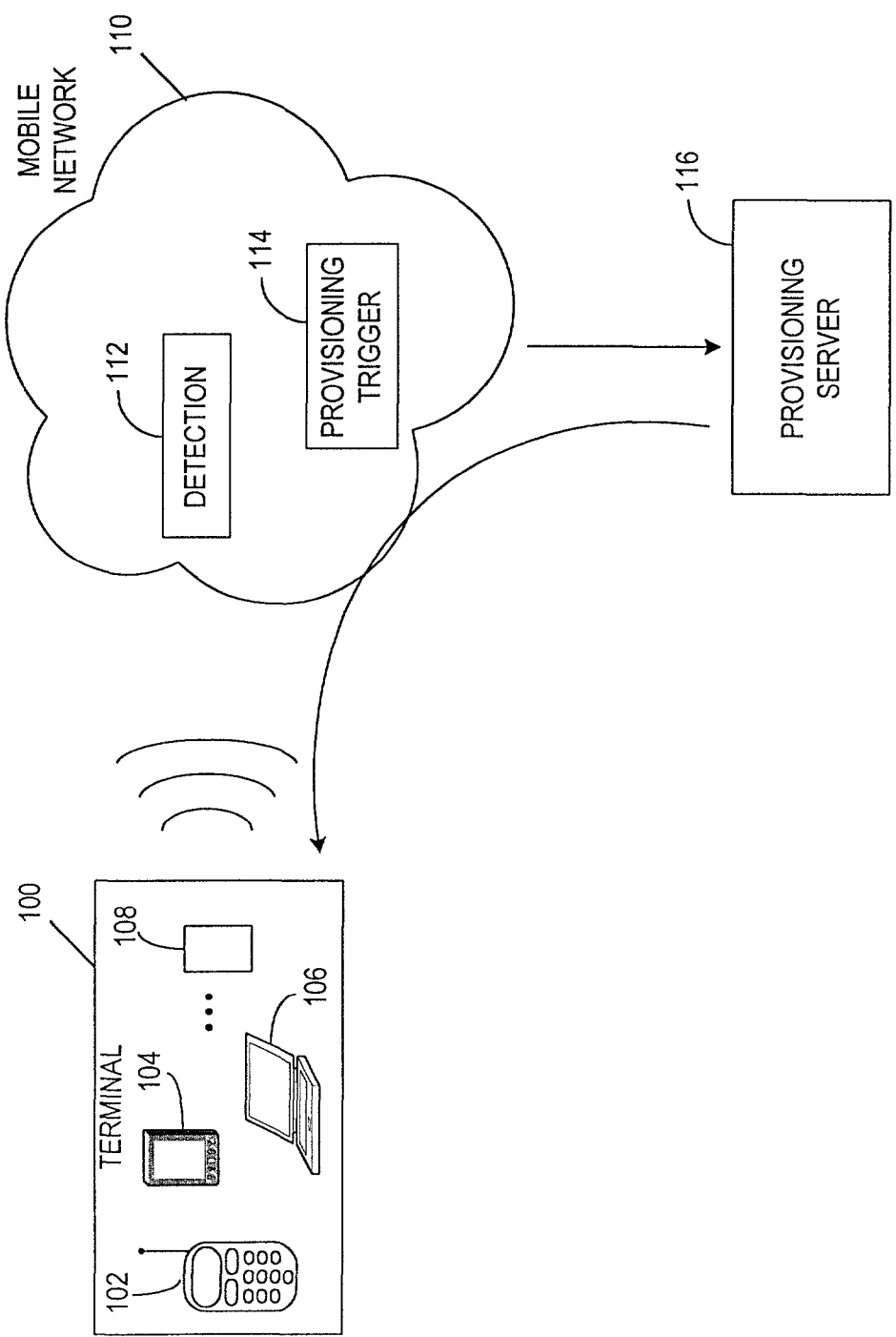
FIG. 1 is a block diagram of an exemplary system in accordance with the principles of the present invention.

FIG. 1 is a block diagram of an exemplary system in accordance with the principles of the present invention. A user of a mobile device, also referred to as a subscriber, may utilize any of a number of mobile communication devices. For purposes of illustration, the wireless terminal 100 may represent any of a number of such mobile communication devices, such as a cellular telephone 102, a personal digital assistant (PDA) 104, a notebook or laptop computer 106, or any other type of terminal represented by device 108. An unprovisioned terminal 100 is one that has not undergone a configuration of initial device/infrastructure connection parameters from a storage location to the terminal. A variety of different types of information may accompany such an initial configuration.

A terminal 100 that has not been provisioned can be automatically detected by a network 110 detection module 112 as being unprovisioned. Upon such detection, a provisioning trigger 114 at the network 110 sends a notification containing predetermined information to a provisioning server 116. In response, the provisioning server 116 provides the provisioning and other configuration data to the terminal 100. Instigation of the provisioning procedure is therefore automatic, and does not require initiation by the user or via some remote system that targets the terminal for provisioning.

Figure 2:
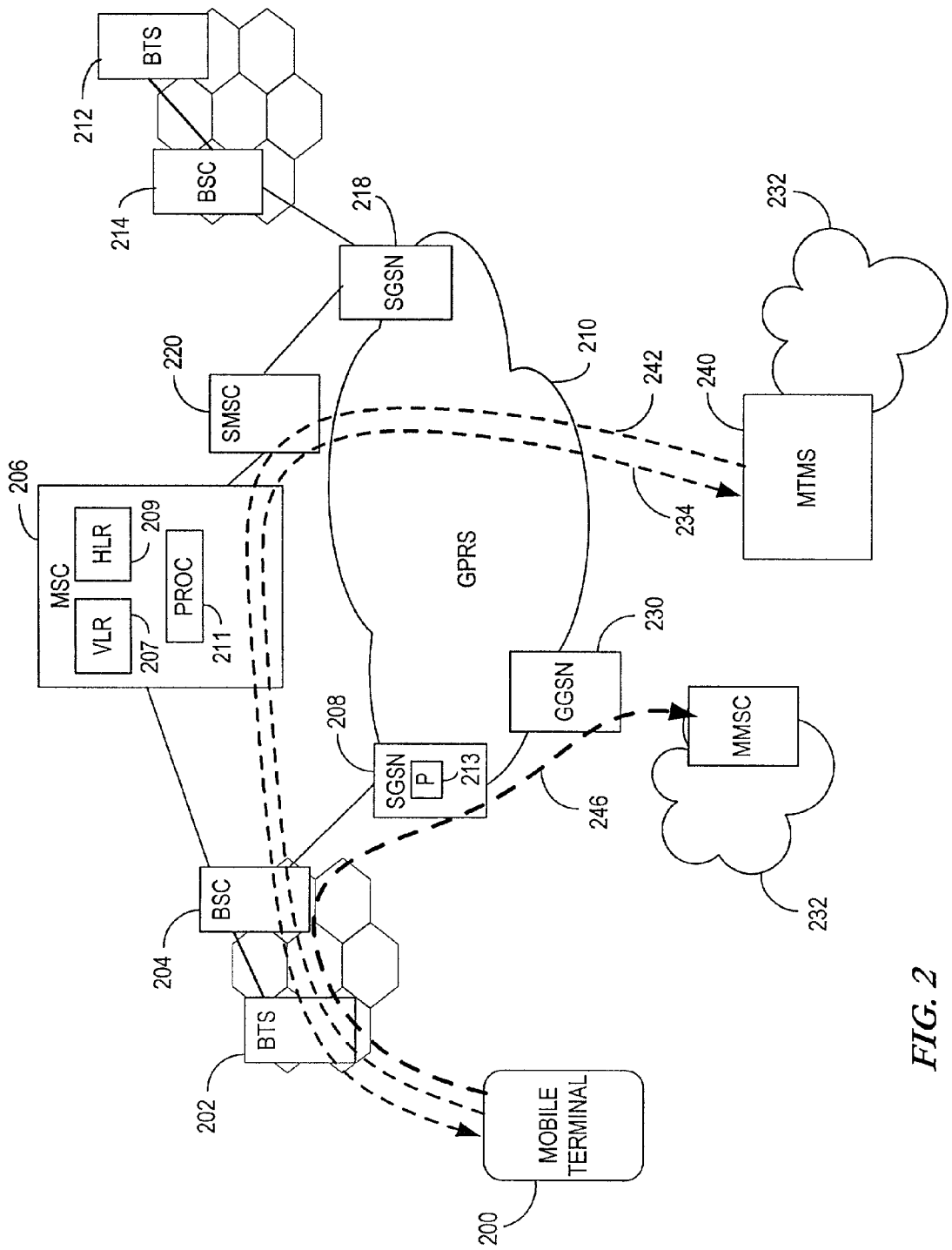
FIG. 2 is a system block diagram illustrating an exemplary networking environment in which the principles of the present invention may be applied.

FIG. 2 is a system block diagram illustrating an exemplary environment in which the principles of the present invention may be applied. FIG. 2 illustrates an embodiment of the invention in connection with a General Packet Radio System (GPRS) mobile communications network. GPRS is a packet-switched service for Global System for Mobile Communications (GSM) that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services.

The various exemplary embodiments described herein are generally described in connection with GPRS, and GSM which is the underlying digital technology of GPRS. However, it should be recognized that the examples provided herein, and the references to GSM and GPRS, are provided to facilitate an understanding of the invention. As will be readily apparent to those skilled in the art from the description provided herein, the invention is equally applicable to other technologies, including other circuit-switched and packet-switched technologies, 3G technologies, and beyond.

Referring to FIG. 2, the terminal 200 communicates with the base transceiver station (BTS) 202 via an air interface. The BTS 200 is a component of a wireless network access infrastructure that terminates the air interface over which subscriber traffic is communicated to and from the terminal 200. The Base Station Controller (BSC) 204 is a switching module that provides, among other things, handoff functions, and controls power levels in each BTS 202. The BSC 204 controls the interface between the Mobile Switching Center (MSC) 206 and BTS 202 in a GSM mobile wireless network, and thus controls one or more BTSs in the call set-up functions, signaling, and in the use of radio channels. The BTS also controls the interface between the Serving GPRS Support Node (SGSN) 208 and the BTS 202 in a GPRS network 210. Other BTS, BSC, and SGSN components may also be associated with the network system, as depicted by BTS 212, BSC 214, and SGSN 218.

The MSC module 206 includes the MSC, Visiting Location Register (VLR) 207, and Home Location Register (HLR) 209. The MSC 206 performs a variety of functions, including providing telephony switching services and controlling calls between telephone and data systems, switching voice traffic from the wireless network to the landline network if the call is a mobile-to-landline call, or alternatively switching to another MSC if the call is a mobile-to-mobile call. The MSC 206 also provides the mobility functions for the network, and serves as the hub for multiple BTSs. Generally, it is the MSC 206 that provides mobility management for subscribers, in order to register subscribers, and authenticate and authorize services and access for subscribers. In GSM systems, some of the functionality of the MSC 206 may be distributed to the BSC 204, while in other systems such as TDMA systems, the BSC 204 functions are integrated with the MSC. The MSC 206 includes a processing module 211 to perform a variety of processing functions, including the detection, comparing, and notification generation functions in accordance with one embodiment of the invention.

Associated with the MSC 206 is the Home Location Register (HLR) 209 and Visiting Location Register (VLR) 207. The HLR 209 is a database that stores information about subscribers in the mobile network, and is maintained by one or more service providers for their respective subscribers. The MSC 206 uses the information stored in the HLR 209 to authenticate and register the subscriber by storing permanent subscriber information including the service profile, the current location of mobile terminals, and activity status of the mobile user. The VLR 207 is a database that is maintained by the MSC 206 to keep track of all the visiting mobile terminals within a mobile telephony system.

The Serving GPRS Support Nodes (SGSN) 208, 218 serve GPRS mobile by sending or receiving packets via a base station subsystem, and more particularly via the BSC 204, 214 in the context of GSM systems. The SGSN is responsible for the delivery of data packets to and from the mobile terminals within its service area, and performs packet routing and transfer, mobility management, logical link management, authentication, charging functions, etc. In the exemplary GPRS embodiment shown in FIG. 2, the location register of the SGSN 208 stores location information such as the current cell and VLR associated with the terminal 200, as well as user profiles such as the International Mobile Subscriber Identity Number (IMSI) of all GPRS users registered with this SGSN. The IMSI is the primary number used to identify a user on a GSM network, and includes a mobile country code, a mobile network code, and a mobile subscription identification number. The IMSI may be stored, for example, in memory of the terminal or in a Subscriber Identity Module (SIM) database which provides for portable user profile information. The SGSN 208 includes a processing module 213 to perform a variety of processing functions, including the detection, comparing, and notification generation functions in accordance with one embodiment of the invention.

A Short Message Service Center (SMSC) 220 may also be employed. The SMSC 220 is a network element through which short messages (e.g., via Short Messaging Service) may be transmitted, and stored for later transmission in the event that the message recipient is not reached. As is described more fully below, one embodiment of the invention utilizes SMS messaging, thus utilizing the services of the SMSC 220 in managing the SMS message transfer.

While GSM forms the underlying technology, the SGSN described above is a network element introduced through GPRS technology. Another network element introduced in the GPRS context is the Gateway GPRS Support Node (GGSN) 230, which acts as a gateway between the GPRS network 210 and a packet switched public data network, such as network 232. This gateway 230 allows mobile subscribers to access the public data network 232 or specified private IP networks. The connection between the GGSN 230 and the public data network is generally enabled through a standard protocol, such as the Internet Protocol (IP).

Bootstrap provisioning in accordance with the invention involves the process providing a terminal with its first set of configurations. In one embodiment of the invention, a subscriber using a new (or otherwise unprovisioned) terminal is automatically detected at the network which subsequently transmits a corresponding notification of the new terminal to a provisioning server. The example shown in FIG. 2 illustrates two exemplary manners in which such detection and notification is accomplished, in both the GSM and GPRS contexts.

In the GSM network context, for example, the mobility management procedures include attach procedures, as well as location update procedures. When a terminal is powered on, it performs a location update procedure by indicating its IMSI to the network. The first location update procedure is referred to as the "attach" procedure. Thus, when a mobile terminal is switched on, or it moves to a new location area or different operator's Public Land Mobile Network (PLMN), it registers with the network to indicate its current location.

In connection with an IMSI/GPRS attach procedure, the mobile terminal provides an Identity Response in response to a request for the identity of the mobile terminal. In GSM networks, the MSC 206 makes the request for the mobile terminal identity, while the SGSN 208 performs this request function in GPRS networks. The Identity Response includes an equipment identifier, such as the International Mobile Equipment Identity (IMEI) in the case of IMSI/GPRS attach procedures. Other current or future attach procedures may include an analogous equipment identity parameter. In IMSI/GPRS attach procedures, the IMEI is compared to an IMEI list in the Equipment Identity Register (EIR) (not shown) to determine the validity or status of the mobile terminal.

In accordance with the invention, the IMEI and IMSI pair is collectively analyzed in order to detect a new affiliation between a subscriber and a particular mobile terminal. In this manner, the network automatically detects mobile terminals that need provisioning. Upon detecting a mobile terminal requiring provisioning, the network initiates transmission of a notification including both the subscriber and equipment information to the provisioning server using a suitable protocol and technology. Various exemplary manners of carrying out such detection and notification procedures are set forth below.

Referring again to FIG. 2, an example of a bootstrap provisioning procedure including the automatic detection and notification principles of the present invention may be described. During an attach procedure, the mobile terminal 200 provides the IMSI and IMEI. In accordance with the invention, the HLR 209 associated with the MSC 206 is equipped with fields to maintain both the IMSI and IMEI (or analogous subscriber/equipment identity parameters). When the mobile terminal provides these parameters, the MSC 206 compares the new IMSI/IMEI combination with a stored IMSI/IMEI combination. For example, a processor (not shown) associated with the MSC 206 operating under the control of software can perform the comparison operation, as can other known comparison modules including discrete comparator circuits known in the art. If the new IMSI/IMEI combination does not match the existing IMSI/IMEI, the MSC 206 can create a message, such as via SMS, including the IMSI and IMEI pair in the user data field of the short message. This SMS message is sent through the SMSC 220 to the external application, which in this example, is the provisioning server illustrated as the Mobile Terminal Management Server (MTMS) 240. This progression of events is illustrated by the dashed line 234.

By comparing the IMEI to a database of corresponding IMEIs and mobile terminal models, the MTMS 240 determines how the terminal 200 shall be configured. A provisioning message is returned to the terminal 200, as depicted by dashed line 242. Depending on the provisioning message content, the terminal may contact the MTMS 240 using a predetermined protocol to obtain further provisioning information. Upon completion of the provisioning process, the terminal 200 may access services, such as a Multimedia Messaging Service (MMS) provided via the Multimedia Message Service Center (MMSC) 244. The availability of this service to the terminal 200 is illustrated by line 246.

The exemplary embodiment of FIG. 2 described a detection and notification methodology in terms of an attach procedure. The present invention is also applicable in the context of a location update procedure, where the equipment identity (e.g., IMEI) is provided to the network in connection with such a location update. The present invention is applicable to other procedures involving presentation of equipment and subscriber identification parameters as well. Further, the invention is applicable regardless of the particular network element effecting the equipment identity request, or of the particular network element detecting a new equipment/subscriber affiliation. For example, in embodiments in which the detection is associated with existing mobility management procedures, the attach procedures may include a request for the equipment identity initiated from the MSC 206 in GSM networks, or from the SGSN 208 in GPRS networks. Similarly, the MSC 206 may monitor the HLR for a new equipment/subscriber affiliation in GSM networks, where the SGSN 208 may perform such an analysis in the GRRS network context.

Figure 3:
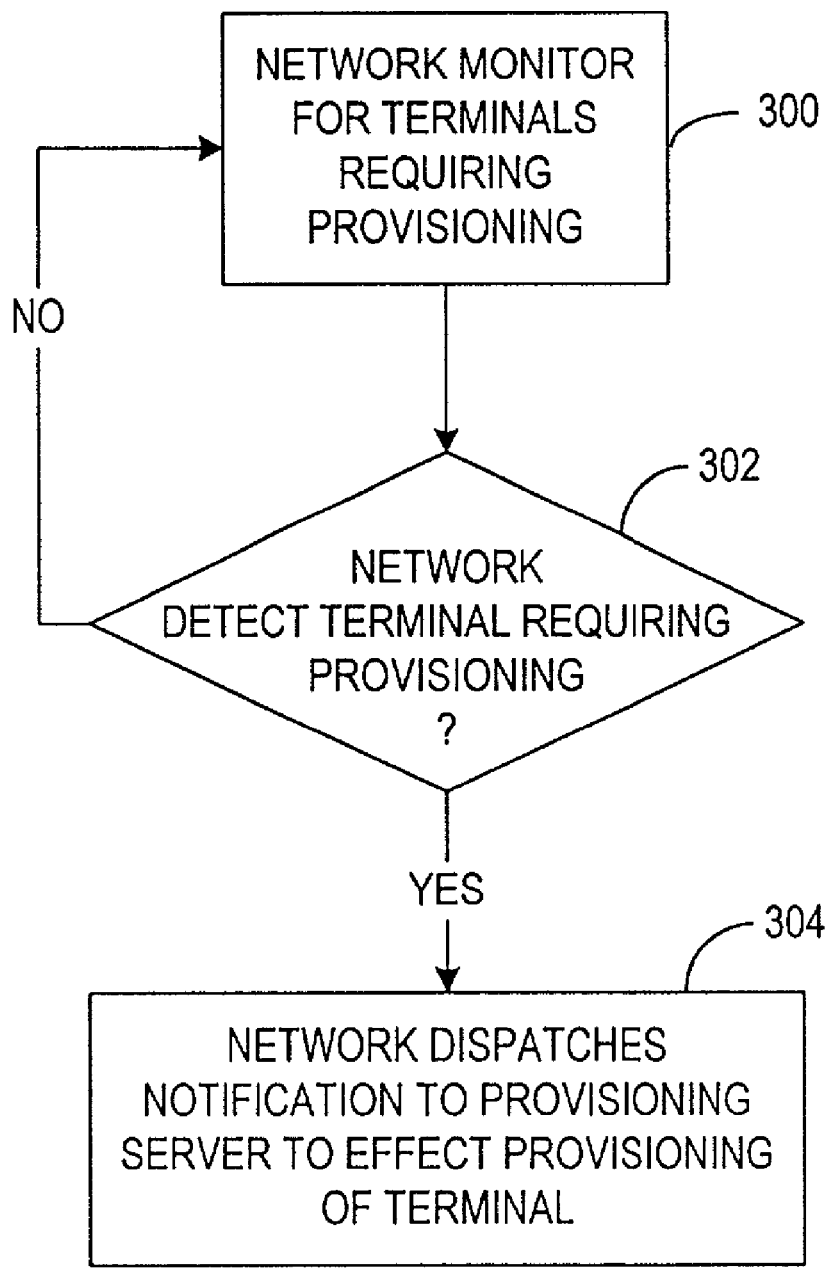
FIG. 3 is a flow diagram illustrating an embodiment of an automatic provisioning detection and notification procedure in accordance with the present invention.

FIG. 3 is a flow diagram illustrating one embodiment of an automatic provisioning detection and notification procedure in accordance with the present invention. The network, through one or more assigned network elements, monitors 300 for terminals requiring provisioning If no terminals requiring provisioning are detected as determined at decision block 302, the network continues to monitor 300 for such terminals requiring provisioning. On the other hand, if a terminal requiring provisioning is detected 302, this triggers the assigned network element(s) to dispatch a notification to a provisioning server to carry out the requisite provisioning of that terminal, as shown at block 304. As seen from the exemplary embodiment illustrated in FIG. 3, provisioning need not be triggered by the terminal user, or by a remote provisioning system. Rather, one or more assigned network elements monitors for terminals requiring provisioning, and automatically instigates provisioning procedures upon detection of a terminal(s) in need of such provisioning.

Figure 4:
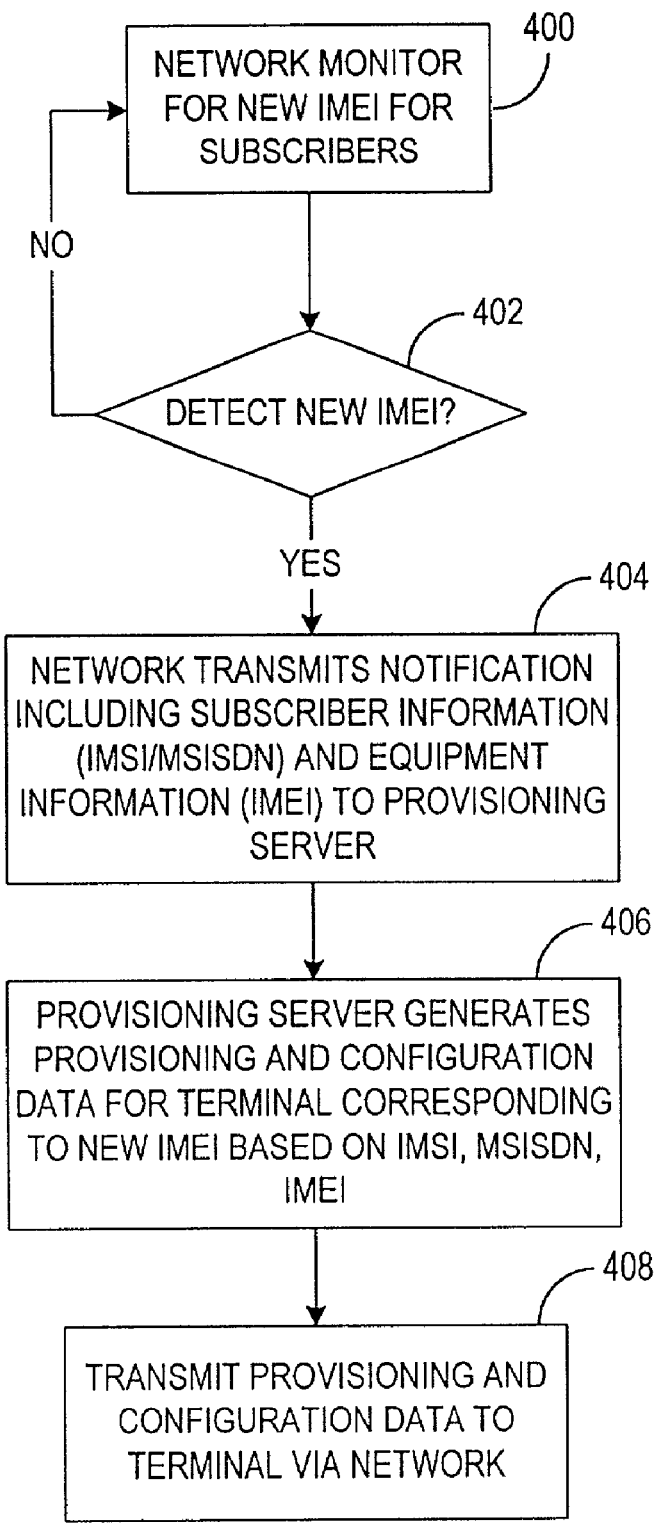
FIGS. 4 and 5 are flow diagrams illustrating more particular embodiments of automatic provisioning detection and notification procedures in accordance with the present invention.

FIG. 4 is a flow diagram illustrating a more particular embodiment of an automatic provisioning detection and notification procedure in accordance with the present invention. The network, through one or more assigned network elements, monitors 400 for new equipment identifiers, such as an IMEI, associated with known subscribers. If a new IMEI is detected 402 for a particular subscriber, the network element transmits a notification to the provisioning server. The notification includes both subscriber and equipment information. In one embodiment, the subscriber information provided to the provisioning server includes the IMSI and the Mobile Station ISDN/PSTN Number (MSISDN). The MSISDN is a mobile number used by GSM/DCS networks that contains information such as the country code, national destination code, HLR identifier and a subscriber number. The notification also includes the IMEI, as shown at block 404.

When the provisioning server receives the notification, it generates provisioning and configuration data for the terminal corresponding to the new IMEI based on the IMSI, MSISDN, and the IMEI, as shown at block 406. This new provisioning and configuration data is transmitted 408 to the terminal via the network. Additional communication between the terminal and the provisioning server may thereafter occur, in order to complete the provisioning procedure.

Figure 5:
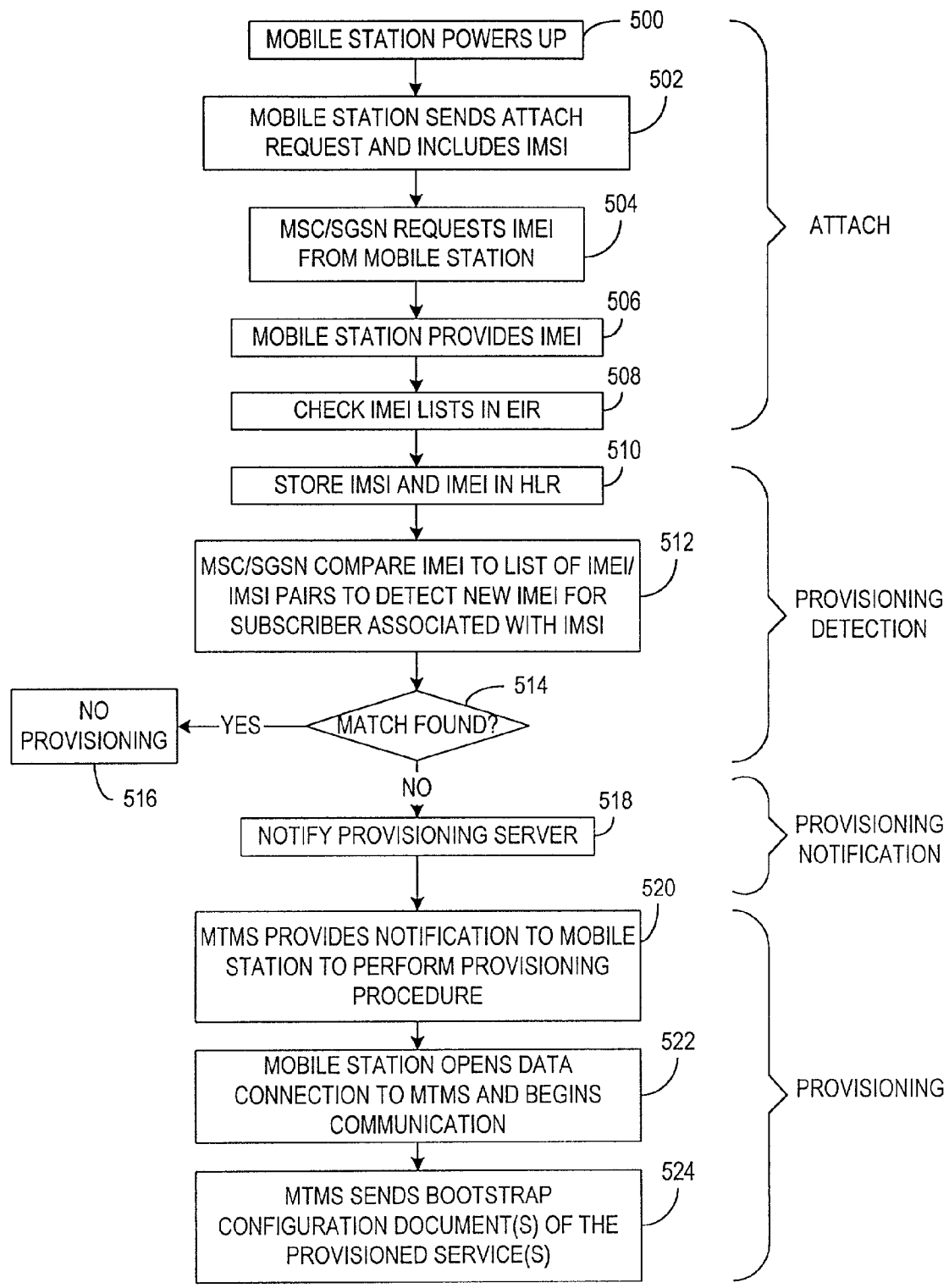

Referring now to FIG. 5, a flow diagram is provided illustrating another particular embodiment of an automatic provisioning detection and notification procedure in accordance with the present invention. This exemplary implementation utilizes certain functions of the mobility management procedures in carrying out the automatic detection and notification methodology of the invention. More particularly, the implementation illustrated in FIG. 5 takes advantage of an ISMI/GPRS attach procedure in order to obtain the subscriber and equipment identities, which are then used in the automatic detection and notification of requisite provisioning.

This exemplary process includes the powering up of a mobile station, such as a mobile telephone, PDA, wireless pager, etc., as shown at block 500. In connection with the attach procedures, the mobile station sends 502 an attach request that includes the subscriber's IMSI. As shown at block 504, the MSC (or SGSN for GPRS attach procedures) requests an IMEI from the mobile station, and the mobile station provides 506 the IMEI in response thereto. In accordance with attach procedures, the EIR is searched to locate the IMEI as depicted at block 508.

The provisioning detection according to one embodiment of the invention includes storing 510 the IMSI and IMEI provided during the attach procedures in a database, such as the HLR. The appropriate network element (e.g., MSC, SGSN, etc.) compares 512 the equipment identifier to a list of IMEI/IMSI pairs in the database, in order to detect whether the IMEI is a new IMEI for the subscriber identified by the IMSI. If a match is found 514, then the mobile station has been provisioned, and no provisioning is required as shown at block 516.

If the IMEI/IMSI pair does not match an IMEI/IMSI pair stored in the HLR, then a need for provisioning has been detected, and the provisioning server such as the MTMS is notified 518 that the mobile station requires provisioning. In one embodiment, the MSC creates an SMS message, including the IMSI and IMEI in a user data field of the SMS message. The MTMS reacts by contacting 520 the mobile station and informing it that a provisioning procedure should take place. In a more particular embodiment, a notification that provisioning is required is sent to the mobile station in the form of a push message, such as a WAP push message. The subscriber may be afforded the opportunity to allow the provisioning to occur, or alternatively to reject or postpone the provisioning procedure.

Where the subscriber chooses (if given the choice) to have the mobile station provisioned, a data connection is opened with the MTMS and communication therebetween may take place, as shown at block 522. In one embodiment of the invention, this communication between the mobile station and the MTMS is effected via a predetermined protocol, such as a SyncML-based protocol. SyncML is a protocol developed by the SyncML consortium that aims to provide a standard way of synchronizing client and server databases. It provides a manner of synchronizing all devices and applications over any network, and is intended to be a future-proof platform leveraging the Extensible Markup Language (XML). With SyncML, networked information can be synchronized with any mobile device, and mobile information can be synchronized with any networked applications. Thus, any personal information, such as email, calendars, to-do lists, contact information and other relevant data, will be consistent, accessible and up to date, no matter where the information is stored.

Through such communication between the MTMS and the mobile station, the MTMS sends 524 the requisite bootstrap configuration document(s) of the provisioned service(s). The mobile station is then equipped to utilize the services provided through the provisioning procedure.

Figure 6:
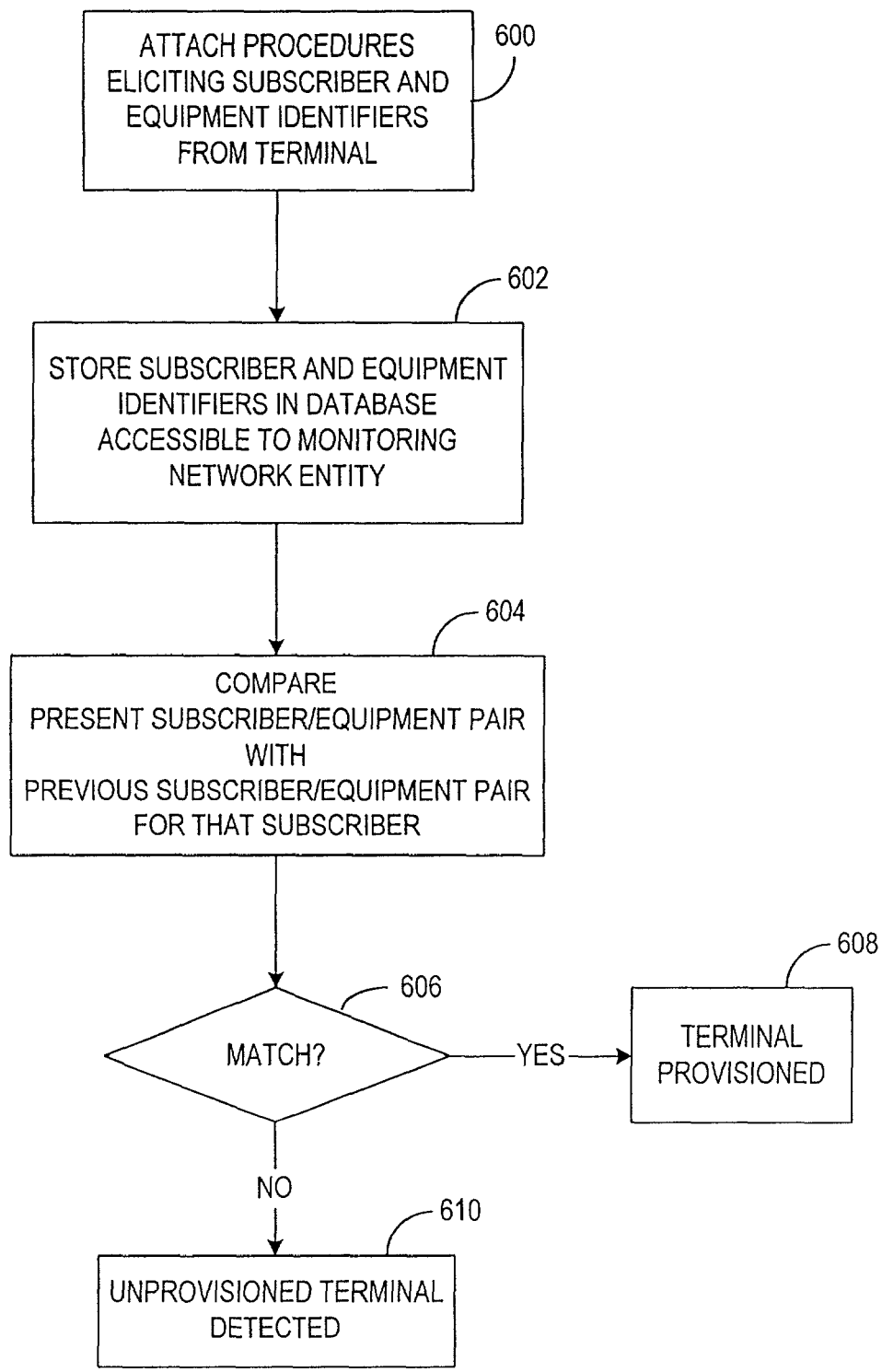
FIG. 6 is a flow diagram illustrating an exemplary embodiment of the detection of unprovisioned terminals in accordance with the invention.

The detection of unprovisioned terminals may be accomplished in various manners in accordance with the invention. Two exemplary embodiments are provided in FIGS. 6 and 8. Referring first to FIG. 6, subscriber and equipment identifiers are elicited from the terminal during attach procedures, as shown at block 600. For example, the subscriber identifier may be represented by the IMSI, and the equipment identifier may be represented by the IMEI. The subscriber and equipment identifiers are stored 602 in a database that is accessible to a monitoring network entity. In one embodiment, the subscriber/equipment identifiers are stored in the HLR database, which is accessible to the network entity specified to monitor these parameters. In a GSM network the MSC is tasked with monitoring these parameters, while the SGSN may be assigned this task in a GPRS environment. Other network entities may be assigned to monitor these parameters, depending on the particular network arrangement and environment in which the present invention is employed.

The network entity, e.g., the MSC, compares 604 the present subscriber/equipment pair with a previously stored subscriber/equipment pair for the subscriber identified by the subscriber identifier. If it is determined 606 that a matching subscriber/equipment pair exists in the database, the terminal has been provisioned. If no match is found, then an unprovisioned terminal has been detected 610.

Figure 7:
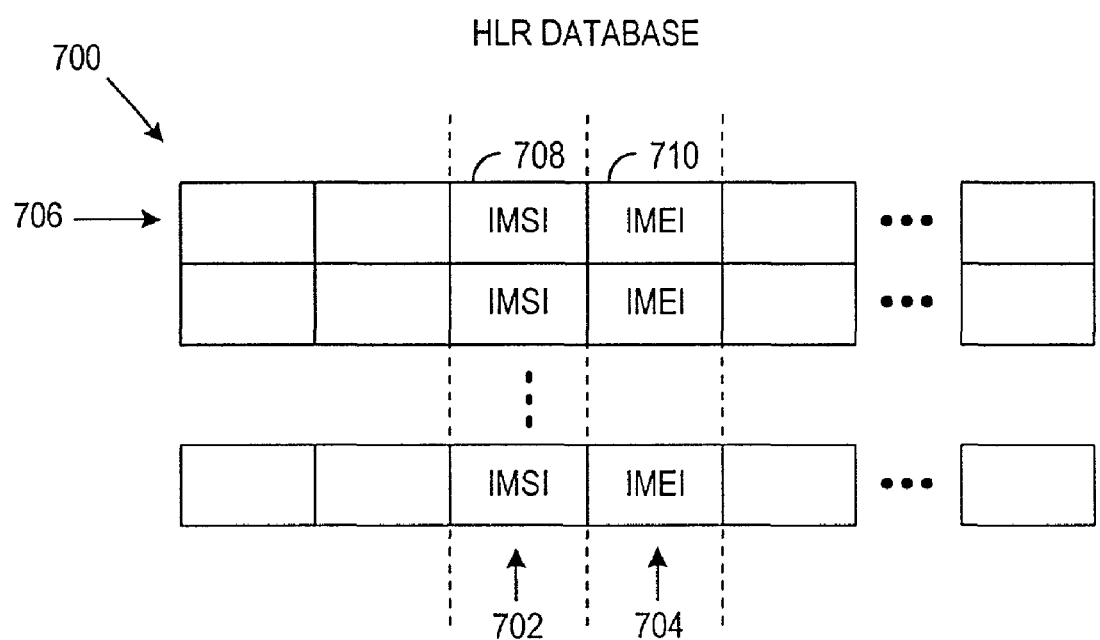
FIG. 7 is a block diagram illustrating an exemplary database having predetermined subscriber and equipment fields for each database record corresponding to a subscriber.

In accordance with the embodiment of FIG. 6, the database in which the IMSI/IMEI pairs may be stored is the HLR. FIG. 7 is a block diagram illustrating the addition of database fields for storing an equipment identifier, thereby allowing comparison of existing IMSI/IMEI affiliations with an IMSI/IMEI affiliation provided by the potentially unprovisioned terminal. As shown in FIG. 7, the HLR 700 includes a plurality of database fields, which in one embodiment is arranged in a plurality of rows such that each predetermined number of rows (e.g., one) corresponds to a particular subscriber. In each row, a field is provided to store the subscriber identifier, such as the IMSI. Another field is provided to store the equipment identifier, such as the IMEI. In the exemplary embodiment of FIG. 7, each row or "record" includes a field for the IMSI, as shown by column 702. Similarly, each row/record includes a field for the IMEI, as shown by column 704. For a particular subscriber, a particular row(s) 706 includes the IMSI 708 and IMEI 710 for that subscriber. In this manner, IMSI and IMEI information provided by the terminal, for example during attach or location update procedures, can be compared to the stored IMSI 708 and IMEI 710 affiliation for that subscriber. Where the received IMSI/IMEI pair does not match the IMSI 708/IMEI 710 pair, the terminal is detected as an unprovisioned terminal.

Figure 8:
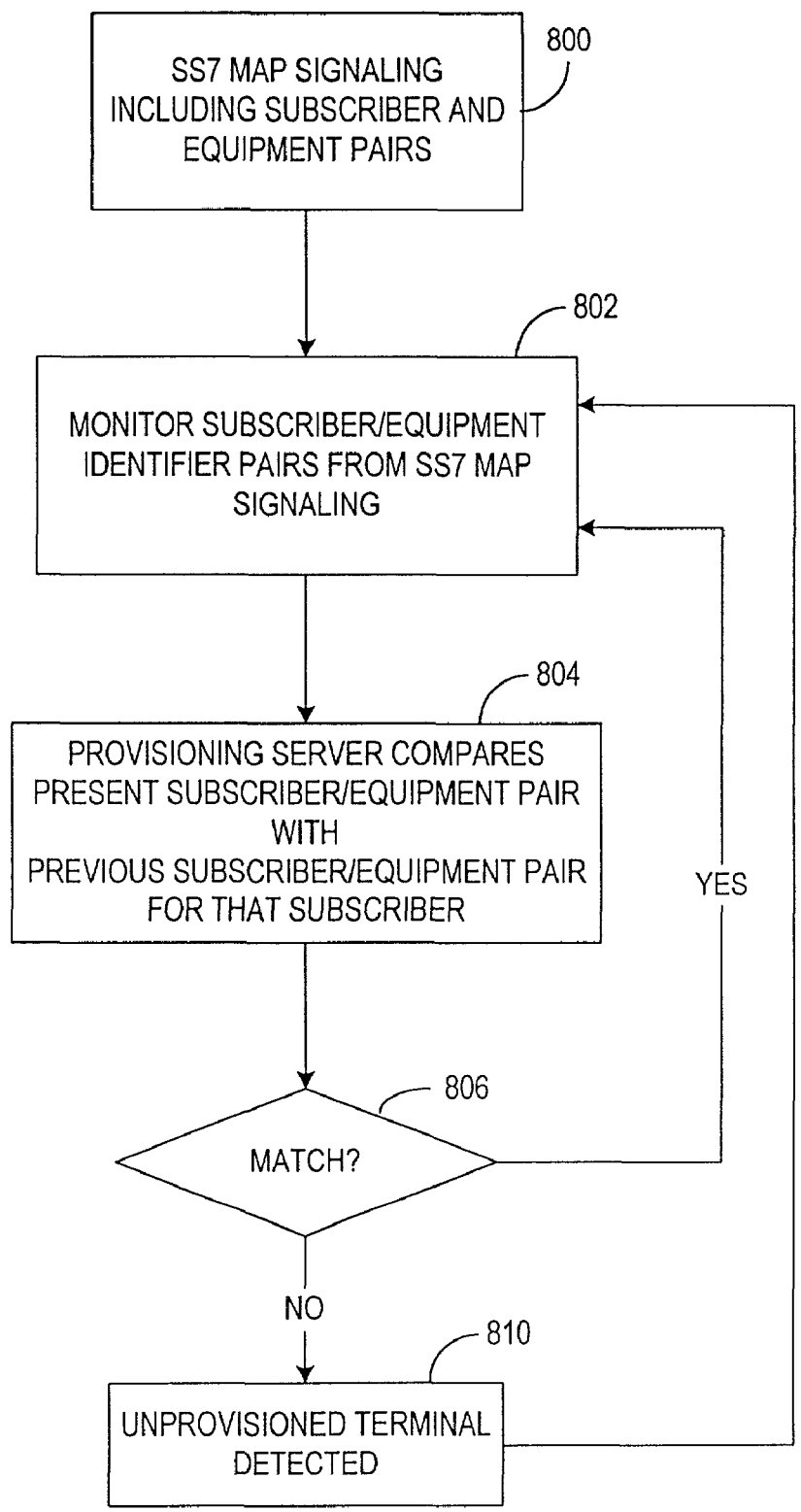
FIG. 8 is a flow diagram illustrating another exemplary embodiment of the detection of unprovisioned terminals in accordance with the invention.

Referring now to FIG. 8, subscriber and equipment pairs are provided in connection with Signaling System 7 (SS7) Mobile Application Part (MAP) signaling, as shown at block 800. SS7 is a standard GSM interface known to those skilled in the art. The subscriber/equipment identifier pairs (e.g., IMSI/IMEI) are directly monitored 802 by the provisioning server. The provisioning server compares 804 the present subscriber/equipment pair with a previously stored subscriber/equipment pair for the subscriber identified by the subscriber identifier. If it is determined 806 that a matching subscriber/equipment pair exists in the provisioning server or associated database, the terminal requires no provisioning, and monitoring 802 can continue. If no match is found, then an unprovisioned terminal has been detected 810. In this embodiment, the provisioning server continuously monitors the identifier pairs from the SS7 MAP signaling, as depicted by the return path from block 810 to block 802.

The notification by the network element to the provisioning server that a terminal requires provisioning may be accomplished in various manners in accordance with the invention. Two exemplary embodiments are provided in FIGS. 9 and 10. Referring first to FIG. 9, when a new IMEI or other suitable equipment identifier for a subscriber is detected 900 as described above, a notification is sent to the provisioning server using a suitable protocol and technology. For example, a "short message" pursuant to the SMS protocol may be created 902 to accommodate the information transfer. In one embodiment, an SMS message is created which includes the subscriber identifier (e.g., IMSI) and equipment identifier (e.g., IMEI) in a user data field as shown at block 902. The SMS message is sent 904 through the SMSC to the provisioning server, such as the MTMS. The MTMS uses the IMEI or other suitable equipment identifier to determine how the mobile terminal is to be configured, as shown at block 906. The MTMS dispatches 908 the terminal configuration to the mobile terminal, allowing the mobile terminal to be provisioned 910. This exemplary notification methodology therefore makes use of short messaging technology to dispatch the appropriate provisioning notification to the provisioning server.

Referring now to FIG. 10, when a new IMEI or other suitable equipment identifier for a subscriber is detected 1000 as previously described, a notification is sent 1002 as an "alarm" to a Network Management System (NMS). For example, a signal can be transmitted to the NMS as an alarm, and the notification including the requisite information such as the IMEI can be forwarded to the NMS. As is known in the art, an NMS is a network system responsible for managing at least part of a network, and generally has the ability to track, monitor and control network resources across a network. By sending an alarm to the NMS, the NMS can be notified of the need for a terminal to be provisioned, and can in turn send 1004 the notification to the provisioning server to carry out such provisioning. The MTMS uses the IMEI or other suitable equipment identifier to determine how the mobile terminal is to be configured, as shown at block 1006. The MTMS sends 1008 the terminal configuration to the mobile terminal, allowing the mobile terminal to be provisioned 1010. This exemplary notification methodology therefore makes use of the capabilities of a Network Management System associated with the network to transmit the appropriate provisioning notification to the provisioning server.

Figure 11:
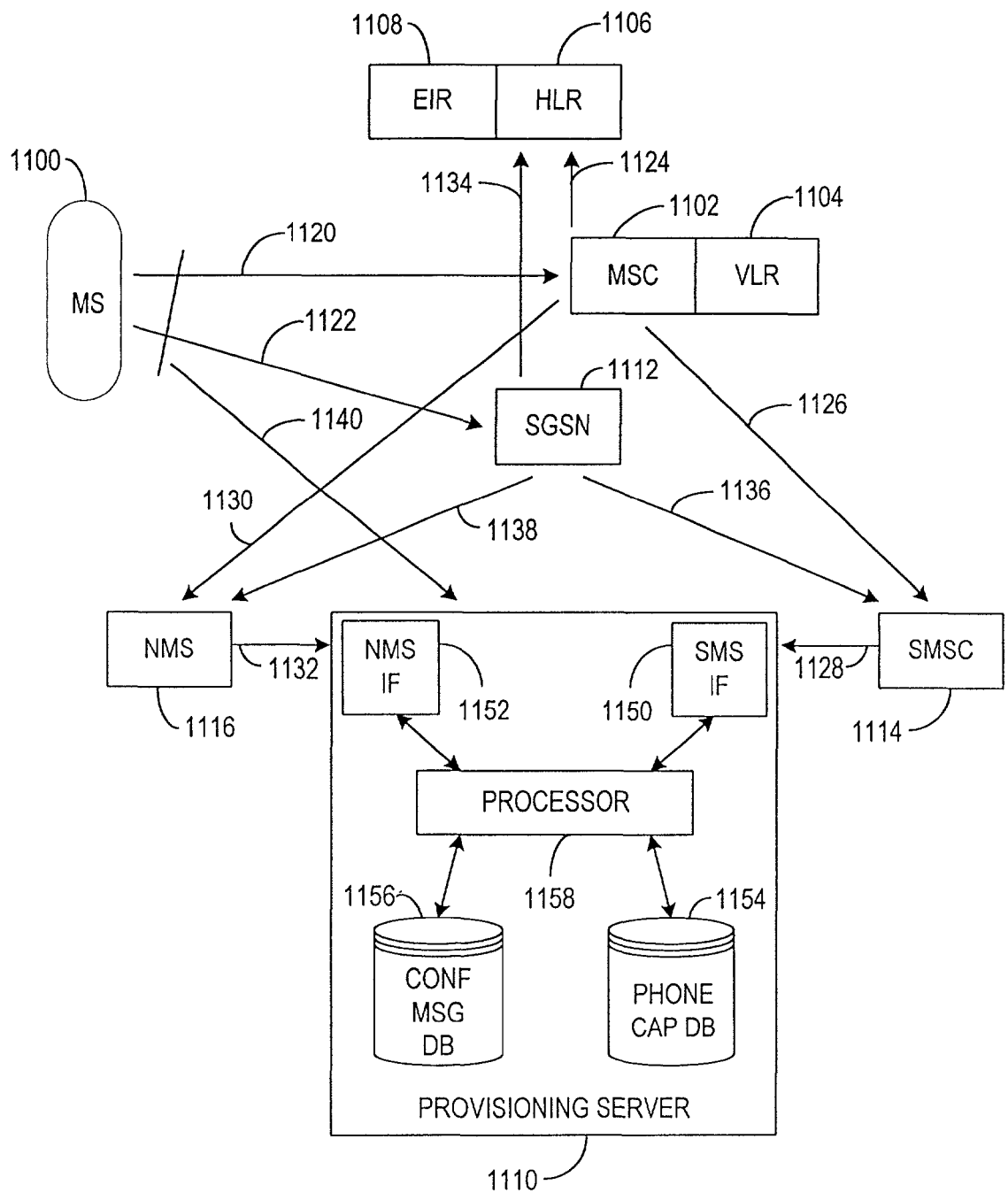
FIG. 11 is a block diagram illustrating a view of various detection and notification options in accordance with the present invention.

FIG. 11 is a block diagram illustrating a view of various detection and notification options in accordance with the present invention. FIG. 11 depicts certain network elements, including the terminal or mobile station (MS) 1100, MSC 1102, VLR 1104, HLR 1106, EIR 1108, provisioning server 1110, SGSN 1112, SMSC 1114, and NMS 1116. Each of these various network elements has been previously described.

Various exemplary options for detecting unprovisioned terminals and providing notification thereof can be seen in FIG. 11. In the illustrated embodiment, the source of the IMEI is the identity response from the MS 1100 during attach procedures, shown on paths 1120, 1122. In GSM networks, the IMEI is provided to the MSC 1102 via path 1120, which detects whether the mobile station needs provisioning by comparing the IMSI/IMEI pair to stored IMSI/IMEI pairs in the HLR 1106 via path 1124. The MSC 1102 then provides a notification to the provisioning server 1110. In one embodiment, this occurs via path 1126 to the SMSC 1114, which in turn forwards the notification to the provisioning server via path 1128. In another embodiment, the notification is provided from the MSC 1102 to the NMS 1116 via path 1130, which in turn notifies the provisioning server 1110 via path 1132.

In GPRS network environments, the IMEI provided with the identity response from the MS 1100 is provided to the SGSN 1112 via path 1122. The SGSN 1112 detects whether the mobile station needs provisioning by comparing the IMSI/IMEI pair to stored IMSI/IMEI pairs in the HLR 1106 via path 1134. The SGSN 1112 then provides a notification to the provisioning server 1110. In one embodiment, this occurs via path 1136 to the SMSC 1114, which in turn forwards the notification to the provisioning server via path 1128. In another embodiment, the notification is provided from the SGSN 1112 to the NMS 1116 via path 1138, which in turn notifies the provisioning server 1110 via path 1132.

In another embodiment, the provisioning server 1110 can monitor the IMSI/IMEI pairs directly from SS7 MAP signaling, as depicted by path 1140. In this case, the provisioning server 1110 stores the IMSI/IMEI pairs itself, and detects when the IMEI for a certain subscriber changes.

The provisioning server 1110 may include various interfaces and databases to carry out the provisioning procedure once it has been notified by the network of a terminal requiring provisioning. For example, for notifications provided through the SMSC 1114, the provisioning server 1110 includes an SMS interface 1150. For notifications provided through the NMS 1116, the provisioning server 1110 includes an NMS interface 1152. The server 1110 may also include a phone capability database 1154, which correlates received IMEI or other suitable equipment identifiers to a particular mobile terminal model or type. From this mobile terminal model/type, the provisioning server 1116 can retrieve default configuration parameters based on that terminal model/type from a configuration messages database 1156. A processing system 1158 provides the requisite processing capabilities to manage the provisioning procedure.

It should be recognized that the aforementioned embodiments are representative examples of the various automatic detection and notification principles described herein, and the invention is not limited to these illustrated embodiments.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

It will, of course, be understood that various modifications and additions can be made to the various embodiments discussed hereinabove without departing from the scope or spirit of the present invention. For example, the invention may be used in connection with any type of networking environment, and is not limited to the exemplary GSM and GPRS network environments described above. The network modifications, such as modification to a Home Location Register or analogous database, may be made in any network environment. Equipment and subscriber identification parameters associated with any specific type of network may be used in connection with the invention, and the specific references to the IMSI and IMEI are provided herein for purposes of facilitating an understanding of the principles and operation of the invention. From the foregoing description of the illustrated embodiments, those of ordinary skill in the art will readily appreciate the applicability of the invention in any comparable network environment. Accordingly, the scope of the present invention should not be limited by the particular embodiments discussed above, but should be defined only by the claims set forth below and equivalents thereof.

What is claimed is:

1. A method for initiating provisioning procedures for terminals operable in a mobile communications network, comprising:
    automatically detecting an unprovisioned terminal in the mobile communications network;
    providing a notification to a provisioning server to initiate the provisioning procedures for the unprovisioned terminal in response to the automatic detection of the unprovisioned terminal; and
    monitoring for a subscriber identifier identifying a particular subscriber and an equipment identifier identifying the unprovisioned terminal, and wherein automatically detecting an provisioned terminal comprises determining that the subscriber and equipment identifiers do not collectively correspond to known subscriber and equipment affiliations.

2. The method of claim 1, wherein determining that the subscriber and equipment identifiers do not collectively correspond to known subscriber and equipment affiliations comprises:
    receiving the subscriber identifier identifying the particular subscriber and the equipment identifier identifying the unprovisioned terminal; and
    comparing the subscriber identifier and the equipment identifier as an affiliated identifier pair to stored identifier pairs comprising known subscriber and equipment affiliations.

3. The method of claim 2, further comprising storing the stored identifier pairs in a Home Location Register (HLR) at the network.

4. The method of claim 3, wherein comparing the affiliated identifier pair to the stored identifier pairs comprises comparing the affiliated identifier pair to the stored identifier pairs at a Mobile Switching Center (MSC).

5. The method of claim 3, wherein comparing the affiliated identifier pair to the stored identifier pairs comprises comparing the affiliated identifier pair to the stored identifier pairs at a Serving GPRS Support Node (SGSN).

6. The method of claim 2, wherein each of the known subscriber and equipment affiliations comprise at least one equipment identifier for each subscriber corresponding to a subscriber identifier.

7. The method of claim 2, wherein receiving a subscriber identifier and an equipment identifier comprises receiving at least an International Mobile Subscriber Identity (IMSI) and an International Mobile Equipment Identity (IMEI).

8. The method of claim 7, wherein comparing the affiliated identifier pair to stored identifier pairs comprises comparing the affiliated identifier pair comprising the IMSI and the IMEI to a plurality of stored IMSI/IMEI pairs.

9. The method of claim 2, further comprising availing the subscriber identifier and the equipment identifier to the mobile communications network in connection with an attach procedure.

10. The method of claim 2, further comprising availing the subscriber identifier and the equipment identifier to the mobile communications network in connection with a location update procedure.

11. The method of claim 2, wherein automatically detecting further comprises recognizing that the affiliated identifier pair does not match any of the stored identifier pairs in response to the comparison.

12. The method of claim 11, wherein providing a notification to a provisioning server comprises notifying the provisioning server in response to a recognition that the affiliated identifier pair does not match any of the stored identifier pairs.

13. The method of claim 2, further comprising providing the subscriber identifier and the equipment identifier by the unprovisioned terminal upon power up of the unprovisioned terminal.

14. The method of claim 2, wherein:
    receiving the subscriber identifier and the equipment identifier comprises continuously monitoring the affiliated identifier pair at the provisioning server through a signaling channel;
    comparing the subscriber identifier and the equipment identifier comprises comparing the affiliated identifier pair to stored identifier pairs at the provisioning terminal; and
    providing a notification to the provisioning server comprises providing the notification internally at the provisioning server.

15. The method of claim 1, wherein providing a notification comprises automatically transmitting the notification to the provisioning server through the mobile communications network upon detection of the unprovisioned terminal.

16. The method of claim 15, further comprising creating a notification message to provide the notification, wherein the notification message includes at least a subscriber identifier identifying a particular subscriber and an equipment identifier identifying the unprovisioned terminal.

17. The method of claim 16, wherein creating the notification message comprises creating a Short Messaging Service (SMS) message including the subscriber and equipment identifiers in a user data field.

18. The method of claim 16, wherein the subscriber identifier comprises at least an International Mobile Subscriber Identity (IMSI).

19. The method of claim 18, wherein the subscriber identifier further comprises a Mobile Station ISDN/PSTN Number (MSISDN).

20. The method of claim 16, wherein the equipment identifier comprises an International Mobile Equipment Identity (IMEI).

21. The method of claim 16, further comprising:
    generating provisioning data at the provisioning server, wherein generating the provisioning data comprises correlating the equipment identifier with corresponding predetermined provisioning data; and
    transmitting the predetermined provisioning data from the provisioning server to the unprovisioned terminal.

22. The method of claim 15, wherein automatically transmitting the notification to the provisioning server through the mobile communications network comprises:
    initiating an alarm at a network management system (NMS);
    forwarding the notification to the NMS; and transmitting the notification from the NMS to the provisioning server.

23. The method of claim 1, further comprising:
generating provisioning data by the provisioning server, and transmitting the provisioning data from the provisioning server to the unprovisioned terminal;
receiving the equipment identifier identifying the unprovisioned terminal and correlating the equipment identifier to a matching terminal type; and wherein generating the provisioning data comprises retrieving default provisioning data corresponding to the matching terminal type.

24. The method of claim 23, further comprising contacting the unprovisioned terminal using a Wireless Application Protocol (WAP) push message to notify the unprovisioned terminal of the transmission of the provisioning data.

25. The method of claim 24, further comprising establishing a connection between the unprovisioned terminal and the provisioning server, and wherein transmitting the provisioning data comprises transmitting the provisioning data via a SyncML-based protocol.

26. A provisioning system for automatically provisioning terminals in a mobile communications network, comprising:
a network element capable of receiving a subscriber identifier and an equipment identifier;
a detection module operable with the network element and capable of being coupled to the mobile communications network and configured to monitor for at least the subscriber identifier and the equipment identifier transmitted from an unprovisioned terminal, and to compare an identifier group comprising the subscriber and equipment identifiers to known subscriber-equipment groups;
a provisioning trigger module capable of communicating with the detection module to generate a provisioning notification based on results of the comparison of the identifier group and known subscriber-equipment groups indicating that the unprovisioned terminal has been introduced on the mobile communications network; and
a provisioning server configured to receive the provisioning notification and to instigate provisioning procedures with the unprovisioned terminal in response to the provisioning notification.

27. The provisioning system as in claim 26, wherein the detection module is integrated with an existing network element of the mobile communications system.

28. The provisioning system as in claim 26, wherein the network element comprises a Mobile Switching Center (MSC) to receive the subscriber identifier and the equipment identifier, and wherein the detection module is integrated with the MSC to monitor for the unprovisioned terminal.

29. The provisioning system as in claim 26, further comprising a database to store the known subscriber-equipment groups.

30. The provisioning system as in claim 29, wherein the database comprises a Home Location Register (HLR) operable in the mobile communications system, wherein each record of the HLR comprises:
a subscriber identity field to store the subscriber identifier; and
an equipment identify field to store the equipment identifier.

31. The provisioning system as in claim 28, wherein the provisioning trigger module is integrated with the MSC to generate the provisioning notification.

32. The provisioning system as in claim 31, further comprising a Short Message Service Center (SMSC) to receive the provisioning notification from the MSC, and to transmit the provisioning notification to the provisioning server, wherein the provisioning notification is dispatched as a Short Messaging Service (SMS) message including at least the subscriber identifier and the equipment identifier.

33. The provisioning system as in claim 31, wherein the provisioning trigger module comprises a processor integral to the MSC, and wherein the processor generates the provisioning notification in response to the detection of the unprovisioned terminal.

34. The provisioning system as in claim 31, further comprising a Network Management System (NMS) to receive the provisioning notification from the MSC as an NMS alarm signal, and to transmit the provisioning notification to the provisioning server in response thereto.

35. The provisioning system as in claim 26, further comprising an Serving GPRS Support Node (SGSN) coupled to receive the subscriber identifier and the equipment identifier, and wherein the detection module is integrated with the SGSN to monitor for the unprovisioned terminal.

36. The provisioning system as in claim 35, wherein the detection module comprises a processor integral to the SGSN, and wherein the processor compares an identifier group comprising the subscriber and equipment identifiers to known subscriber-equipment groups.

37. The provisioning system as in claim 36, further comprising a Home Location Register (HLR) database operable in the mobile communications system to store the known subscriber-equipment groups, wherein each record of the HLR comprises:
a subscriber identity field to store the subscriber identifier; and
an equipment identify field to store the equipment identifier.

38. The provisioning system as in claim 35, wherein the provisioning trigger module is integrated with the SGSN to generate the provisioning notification.

39. The provisioning system as in claim 38, further comprising a Short Message Service Center (SMSC) to receive the provisioning notification from the SGSN, and to transmit the provisioning notification to the provisioning server, wherein the provisioning notification is dispatched as a Short Messaging Service (SMS) message including at least the subscriber identifier and the equipment identifier.

40. The provisioning system as in claim 38, wherein the provisioning trigger module comprises a processor integral to the SGSN, and wherein the processor generates the provisioning notification in response to the detection of the unprovisioned terminal.

41. The provisioning system as in claim 38, further comprising a Network Management System (NMS) to receive the provisioning notification from the SGSN as an NMS alarm signal, and to transmit the provisioning notification to the provisioning server in response thereto.

42. The provisioning system as in claim 26, wherein the provisioning server comprises:
a phone capability database to store mobile terminal models corresponding to each of a plurality of available equipment identifiers;
a configuration messages database to store provisioning data for each mobile terminal model; and
a processor configured to obtain the provisioning data for the unprovisioned terminal by retrieving the provisioning data for the mobile terminal model corresponding to the equipment identifier of the unprovisioned terminal.

43. A non-transitory computer-readable medium having computer-executable instructions for initiating provisioning procedures for terminals operable in a mobile communications network, the computer-executable instructions performing steps comprising: automatically detecting an unprovisioned terminal in the mobile communications network; mad providing a notification to a provisioning server to initiate the provisioning procedures for the unprovisioned terminal in response to the automatic detection of the unprovisioned terminal; and monitoring for a subscriber identifier identifying a particular subscriber and an equipment identifier identifying, the unprovisioned terminal, and wherein automatically detecting, unprovisioned terminal comprises that the subscriber and equipment identifiers do not collectively correspond to known subscriber and equipment affiliations.

44. A provisioning system for automatically provisioning terminals in a mobile communications network, comprising:

means for receiving a subscriber identifier identifying a particular subscriber and an equipment identifier identifying an unprovisioned terminal, and for comparing an identifier group comprising the subscriber and equipment identifiers to known subscriber-equipment groups;

means for automatically detecting the unprovisioned terminal in the mobile communications network, including means for determining that the subscriber and equipment identifiers do not collectively correspond to known subscriber and equipment affiliations based on results of the comparison; and means for providing a notification to a provisioning server to initiate a provisioning procedure for the unprovisioned terminal in response to the automatic detection of the unprovisioned terminal.

45. A network element for facilitating provisioning of terminals in a mobile communications network, the network element comprising:

a detection module capable of communicating via the mobile communications network and configured to monitor for subscriber and equipment identifiers associated with one or more of the terminals, and to identify unprovisioned terminals introduced into the mobile communication network based on correspondence between the subscriber and equipment identifiers and any of a plurality of known subscriber and equipment affiliations; and a provisioning trigger module coupled to the detection module to generate provisioning notifications for the unprovisioned terminals identified via the detection module, wherein each provisioning notification indicates that the respective unprovisioned terminal is to be provisioned.

* * * * *

UNITED STATES PATENT AND TRADEMARK OFFICE
CERTIFICATE OF CORRECTION

PATENT NO.       : 8,107,937 B2
APPLICATION NO.  : 09/919317
DATED            : January 31, 2012
INVENTOR(S)      : Hannu J. Jokinen and Esa Ihamäki Page 1 of 1

It is certified that error appears in the above-identified patent and that said Letters Patent is hereby corrected as shown below:

In the Claims

Column 13, line 30, Claim 1: "an provisioned" should read --an unprovisioned--.

Signed and Sealed this
Eighth Day of May, 2012

David J. Kappos
*Director of the United States Patent and Trademark Office*